(12) United States Patent
Kilmartin et al.

(10) Patent No.: US 11,192,793 B2
(45) Date of Patent: Dec. 7, 2021

(54) METHOD

(71) Applicant: JOHNSON MATTHEY PUBLIC LIMITED COMPANY, London (GB)

(72) Inventors: John Kilmartin, Reading (GB); Ashwin Sankaran, Reading (GB); David Thompsett, Reading (GB)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 16/693,441

(22) Filed: Nov. 25, 2019

(65) Prior Publication Data
US 2020/0172405 A1 Jun. 4, 2020

(30) Foreign Application Priority Data
Nov. 29, 2018 (GB) .................................. 1819416

(51) Int. Cl.
C01B 39/02 (2006.01)
B01J 29/70 (2006.01)
B01J 29/74 (2006.01)
B01J 29/76 (2006.01)
B01D 53/94 (2006.01)
B01J 37/02 (2006.01)
B01J 37/08 (2006.01)
F01N 3/20 (2006.01)

(52) U.S. Cl.
CPC ........ *C01B 39/026* (2013.01); *B01D 53/9418* (2013.01); *B01J 29/70* (2013.01); *B01J 29/7015* (2013.01); *B01J 29/74* (2013.01); *B01J 29/743* (2013.01); *B01J 29/76* (2013.01); *B01J 29/763* (2013.01); *B01J 37/0219* (2013.01); *B01J 37/0236* (2013.01); *B01J 37/08* (2013.01); *F01N 3/2066* (2013.01); *B01J 2229/32* (2013.01); *F01N 2370/04* (2013.01)

(58) Field of Classification Search
CPC ..... C01B 39/026; B01J 29/70; B01J 29/7015; B01J 29/74; B01J 29/743; B01J 37/0219; B01J 2229/32; B01D 53/94; B01D 53/9418
See application file for complete search history.

(56) References Cited

U.S. PATENT DOCUMENTS

| 4,300,956 A | 11/1981 | Rosenberger et al. |
| 5,146,743 A | 9/1992 | Maus et al. |
| 5,371,312 A | 12/1994 | Lago et al. |
| 6,508,860 B1 | 1/2003 | Kulkarni et al. |
| 6,513,324 B2 | 2/2003 | Bruck et al. |
| 6,663,805 B1 | 12/2003 | Ekiner et al. |
| 2006/0107830 A1 | 5/2006 | Miller et al. |
| 2015/0321151 A1 | 11/2015 | Lee et al. |

FOREIGN PATENT DOCUMENTS

| CN | 108002827 A | 5/2018 |
| EP | 0703886 | 4/1996 |
| WO | 9947260 A1 | 9/1999 |
| WO | 2007077462 A1 | 7/2007 |
| WO | 2011080525 A1 | 7/2011 |
| WO | 2013183969 A1 | 12/2013 |
| WO | 2014195685 A1 | 12/2014 |

OTHER PUBLICATIONS

Kulak et al, "Orientation controlled monolayer assembly of zeolite crystals on glass and mica by covalent linkage of surface bound epoxide and amine groups", Angew, Chem Int. Ed. 2000, 39, No. 5 (Year: 2000).*
Kong et al, "Conversion of Sucrose into Lactic Acid over Functionalized Sn-Beta Zeolite Catalyst by 3-Aminopropyltrimethoxysilane": http://pubs.acs.org/journal/acsodf ACS Omega 2018, 3, 17430-17438 (Year: 2018).*
Huang et al, "Synthesis of multi-layer zeolite LTA membranes with enhanced gas separation performance by using 3-aminopropyltriethoxysilane as interlayer", Microporous and Mesoporous Materials vol. 164, Dec. 1, 2012, pp. 294-301 (Year: 2012).*
Xu et al, "Silver-exchanged zeolite LTA molecular sieving membranes with enhanced hydrogen selectivity", Journal of Membrane Science vol. 511, Aug. 1, 2016, pp. 1-8 (Year: 2016).*
Chen et al., "Mixed matrix membranes of aminosilanes grafted FAU/EMT zeolite and cross-linked polymide for CO2/CH4 separation," Polymer 2012 (53) pp. 3269-3280.
Nik et al., "Aminosilanes Grafting on FAU/EMT Zeolite: Effect on CO2 Adsorptive Properties," Micro. Meso. Materials 2011 (143) pp. 221-229.

\* cited by examiner

*Primary Examiner* — David M Brunsman

(57) ABSTRACT

A method for modifying the surface of a molecular sieve, comprising reacting a molecular sieve with an aminosilane, wherein the reaction is carried out in an aqueous solvent. A modified molecular sieve obtained by the method is also described.

28 Claims, No Drawings

METHOD

FIELD OF THE INVENTION

The invention relates to a method for modifying the surface of a molecular sieve. The invention also relates to modified molecular sieves obtained or obtainable by such a method, a washcoat, a method of forming a catalyst article, and catalyst articles obtained or obtainable by such a method.

BACKGROUND OF THE INVENTION

Known SCR (selective catalytic reduction) catalysts include molecular sieves. Useful molecular sieves include crystalline or quasi-crystalline materials which can be, for example aluminosilicates (zeolites) or silicoaluminophosphates (SAPOs). Such molecular sieves are constructed of repeating $SiO_4$, $AlO_4$, and optionally $PO_4$ tetrahedral units linked together, for example in rings, to form frameworks having regular intra-crystalline cavities and channels of molecular dimensions. The specific arrangement of tetrahedral units (ring members) gives rise to the molecular sieve's framework, and by convention, each unique framework is assigned a unique three-letter code (e.g., "CHA") by the International Zeolite Association (IZA). Examples of molecular sieve frameworks that are known SCR catalysts include Framework Type Codes CHA (chabazite), BEA (beta), and MOR (mordenite).

Molecular sieve catalysts, in particular zeolite catalysts, may be metal-promoted. Examples of metal-promoted molecular sieve catalysts include iron-, copper- and palladium-promoted molecular sieve catalysts, where the metal may be introduced into the molecular sieve by, for example, ion exchange or impregnation. Iron- and copper-promoted molecular sieves (e.g. zeolites) are known to promote SCR reactions. Palladium-promoted molecular sieves (e.g. zeolites) are known for use in passive NOx adsorbers (PNA).

Typically, molecular sieve catalysts are disposed on or within a substrate, such as a monolith, to form a catalytic article. The molecular sieve catalyst may be applied to the substrate as a washcoat or may form part of the substrate itself (e.g. an extruded catalyst). It is known in the art that crystalline molecular sieves may need to be milled prior to being incorporated into a washcoat formulation, even though the pore sizes of the substrate may be much larger than the particle size of the smallest variety of un-milled molecular sieve. It is sometimes required to mill molecular sieves to deaggregate or comminute particles to a desired particle size distribution and shape needed to meet a particular downstream process requirement or product specification. This addition of a milling step, however, increases the time and difficulty of preparing molecular sieve-containing washcoat formulations. The requirement for a milling step in a process can also introduce an undesirable amount of variability in the final product, as it can be difficult to quantify the end point for a milling process.

It would therefore be a significant advancement in the art of catalyst preparation if a means to obtain molecular sieve catalysts (e.g. zeolite catalysts) with uniform, predictable bulk properties without the need to mill such catalysts was provided.

SUMMARY OF THE INVENTION

In a first aspect of the invention there is provided a method of modifying the surface of a molecular sieve comprising reacting a crystalline molecular sieve with an aminosilane, wherein the reaction is carried out in an aqueous solvent.

The aqueous solvent may comprise water in an amount of at least 10% by volume. In a second aspect, the invention provides a modified molecular sieve obtained or obtainable by the method as hereinbefore described.

In a third aspect of the invention there is provided a washcoat comprising a modified molecular sieve obtained or obtainable by the method defined above.

In a fourth aspect, the invention provides a method for forming a catalyst article comprising the steps of:
I. coating a substrate with a washcoat comprising a modified molecular sieve as hereinbefore defined; and
II. drying and/or calcining the coated substrate.

In a fifth aspect, the invention provides a method for forming a catalyst article comprising the steps of:
a) reacting a crystalline molecular sieve with an aminosilane in an aqueous solvent to form a modified molecular sieve;
b) coating a substrate with a washcoat comprising the modified molecular sieve prepared in step a); and
c) drying and/or calcining the coated substrate.

In a sixth aspect, the invention provides a catalyst article obtained or obtainable by the method as hereinbefore defined.

In a seventh aspect, the invention provides a method of treating an exhaust gas comprising contacting the exhaust gas with a catalyst article as hereinbefore described.

DEFINITIONS

The term "washcoat" is well known in the art. A washcoat typically comprises a liquid and a catalyst component. The washcoat may take the form of a solution, for example a slurry or suspension, of catalytic material in a solvent.

The term "noble metal" as used herein generally refers to a metal selected from the group consisting of ruthenium, rhodium, palladium, silver, osmium, iridium, platinum, and gold. In general, the term "noble metal" preferably refers to a metal selected from the group consisting of rhodium, platinum, palladium and gold.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of metal-oxides in a single phase, as is conventionally known in the art. The term "composite oxide" as used herein generally refers to a composition of metal-oxides having more than one phase, as is conventionally known in the art.

The term "solution" as used herein generally refers to a material or substance that has been dissolved in a solvent, but also encompasses the terms "suspension" or "slurry". Thus, the expression "aqueous solution" as used herein may refer to a suspension or slurry in which a significant portion of a material is not dissolved in an aqueous medium, but is suspended or slurried in it, e.g. an admixture of a material and an aqueous medium.

The expression "consists essentially of" as used herein limits the scope of a feature to include the specified materials, and any other materials or steps that do not materially affect the basic characteristics of that feature, such as for example minor impurities. The expression "consists essentially of" embraces the expression "consisting of".

The expression "substantially free of" as used herein with reference to a material means that the material may be present in a minor amount, such as 5% by weight, preferably 2% by weight, more preferably 1% by weight. The expression "substantially free of" embraces the expression "does not comprise".

The term "acid" as used herein refers to a Lewis acid or a Bronsted acid.

The term "base" as used herein refers to a Lewis base or a Bronsted base.

DETAILED DESCRIPTION OF THE INVENTION

Preferred and/or optional features of the invention will now be set out. Any aspect of the invention may be combined with any other aspect of the invention unless the context demands otherwise. Any of the preferred and/or optional features of any aspect may be combined, either singly or in combination, with any aspect of the invention unless the context demands otherwise.

Where ranges are specified herein it is intended that each endpoint of the range is independent. Accordingly, it is expressly contemplated that each recited upper endpoint of a range is independently combinable with each recited lower endpoint, and vice versa.

In the present invention the surface of a crystalline molecular sieve is modified by reacting the crystalline molecular sieve with an aminosilane, wherein the reaction is carried out in an aqueous solvent. It has surprisingly been found that, by modifying the surface of crystalline molecular sieves in this manner, molecular sieve catalysts, such as SCR catalysts, may be produced, that meet specification (i.e. have equivalent bulk physical properties), without the requirement to mill the molecular sieves. The removal of a required milling step in the preparation of washcoats for coating onto substrates is advantageous as it results in cost savings, e.g. from the milling equipment itself and the associated energy and operator input, as well as increased ease of operation of the overall process and increased robustness of final products.

It has also been found that by using an aminosilane it is possible to change the surface charge of a molecular sieve to a positively charged surface in an acidic (pH <7) environment. The use of specific aminosilane-based functionalities means that further complex colloidal structures can be fabricated using self-assembly. Examples of aminosilanes that may be used are from the Hydrosil and Sivo brands sold by Evonik. Specific examples include Hydrosil 1151, Hydrosil 2909, Hydrosil 2627 and SIVO 160.

By modifying the surface of the crystalline molecular sieve, e.g. zeolite, by reacting the crystalline molecular sieve with an aminosilane, the resulting modified molecular sieve has a uniform and consistent surface chemistry profile, due to the presence of an amine moiety at the surface of the modified molecular sieve. This consistent surface chemistry profile results in an improvement in the ease of processing and handling of the modified molecular sieves, and in particular in coating washcoats comprising such modified molecular sieves onto substrates, such as monolith substrates. These advantages are particularly apparent when coating filter substrates (e.g. wall-flow filter substrates), which can be more challenging to coat consistently compared to flowthrough substrates.

In addition, the use of aminosilanes provides a robust and universal dispersion strategy for crystalline molecular sieves (e.g. zeolites) in the preparation of washcoats compared to conventional methods. Conventional surfactants and/or dispersants do not work universally over a range of molecular sieve types and are prone to failure due to variations in production batches. Without wishing to be bound by theory, it is believed that the improved dispersibility achieved by modified molecular sieves may be attributed to altering the surface charge of the molecular sieve. In particular, it is believed that increasing the isoelectric point of the molecular sieve (i.e. the pH at which the surface charge of the molecular sieve is zero) may provide for improved dispersibility.

It has surprisingly been found that using modified molecular sieves, e.g. zeolites, prepared by a method according to the present invention in a method for forming a catalyst article wherein the modified molecular sieve is applied to a substrate (e.g. wall-flow filter) in a washcoat, catalyst articles may be formed which exhibit lower backpressure in use when compared to comparable catalyst articles that have been prepared using unmodified (i.e. not having been reacted with an aminosilane) crystalline molecular sieves, e.g. unmodified zeolites.

The crystalline molecular sieve is typically composed of aluminium, silicon, and/or phosphorus. The crystalline molecular sieve generally has a three-dimensional arrangement (e.g. framework) of $SiO_4$, $AlO_4$, and optionally $PO_4$ that are joined by the sharing of oxygen atoms. The crystalline molecular sieve may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

Preferably, the crystalline molecular sieve has an aluminosilicate framework, an aluminophosphate framework, a silicoaluminophosphate framework, a metal-loaded aluminosilicate framework, a metal-loaded aluminophosphate framework, or a metal-loaded silicoaluminophosphate framework. Particularly preferably, the crystalline molecular sieve has an aluminosilicate framework or a metal-loaded aluminosilicate framework. The crystalline molecular sieve may have an aluminosilicate framework or an aluminophosphate framework. It is preferred that the crystalline molecular sieve has an aluminosilicate framework or a silicoaluminophosphate framework. More preferably, the crystalline molecular sieve has an aluminosilicate framework.

When the crystalline molecular sieve has an aluminosilicate framework, then the molecular sieve is preferably a zeolite.

The crystalline molecular sieve may be selected from a small pore crystalline molecular sieve (i.e. a crystalline molecular sieve having a maximum ring size of eight tetrahedral atoms), a medium pore crystalline molecular sieve (i.e. a crystalline molecular sieve having a maximum ring size of ten tetrahedral atoms) and a large pore crystalline molecular sieve (i.e. a crystalline molecular sieve having a maximum ring size of twelve tetrahedral atoms). More preferably, the crystalline molecular sieve is selected from a small pore crystalline molecular sieve and a medium pore crystalline molecular sieve.

In a first crystalline molecular sieve embodiment, the crystalline molecular sieve is a small pore molecular sieve. The small pore crystalline molecular sieve preferably has a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON, as well as a mixture or intergrowth of any two or more thereof. The intergrowth is preferably selected from KFI-SIV, ITE-RTH, AEW-UEI, AEI-CHA, and AEI-SAV. More preferably, the small pore crystalline molecular sieve has a Framework Type that is AEI, CHA or an AEI-CHA intergrowth. Even more preferably, the small pore crystalline molecular sieve has a Framework Type that is AEI, AFX or CHA, particularly AEI.

Preferably, the small pore crystalline molecular sieve has an aluminosilicate framework or a silico-aluminophosphate framework. More preferably, the small pore crystalline molecular sieve has an aluminosilicate framework (i.e. the molecular sieve is a zeolite), especially when the small pore crystalline molecular sieve has a Framework Type that is AEI, CHA or an AEI-CHA intergrowth, particularly AEI or CHA.

In a second crystalline molecular sieve embodiment, the crystalline molecular sieve has a Framework Type selected from the group consisting of AEI, MFI, EMT, ERI, MOR, FER, BEA, FAU, CHA, LEV, MWW, CON and EUO, as well as mixtures of any two or more thereof.

In a third crystalline molecular sieve embodiment, the crystalline molecular sieve is a medium pore crystalline molecular sieve. The medium pore crystalline molecular sieve preferably has a Framework Type selected from the group consisting of MFI, FER, STI, MWW and EUO, more preferably MFI.

In a fourth crystalline molecular sieve embodiment, the crystalline molecular sieve is a large pore crystalline molecular sieve. The large pore crystalline molecular sieve preferably has a Framework Type selected from the group consisting of CON, BEA, FAU, MOR and EMT, more preferably BEA.

In each of the first to fourth crystalline molecular sieve embodiments, the crystalline molecular sieve preferably has an aluminosilicate framework (e.g. the crystalline molecular sieve is a zeolite). Each of the aforementioned three-letter codes represents a framework type in accordance with the "IUPAC Commission on Zeolite Nomenclature" and/or the "Structure Commission of the International Zeolite Association".

In any one of the first to fourth crystalline molecular sieve embodiments, it may generally be preferred that the crystalline molecular sieve (e.g. large pore, medium pore or small pore) has a framework that is not an intergrowth of at least two different Framework Types.

The crystalline molecular sieve typically has a silica to alumina molar ratio (SAR) of 10 to 200 (e.g. 10 to 40), such as 10 to 100, more preferably 15 to 80 (e.g. 15 to 30). The SAR generally relates to a molecule having an aluminosilicate framework (e.g. a zeolite) or a silico-aluminophosphate framework, preferably an aluminosilicate framework (e.g. a zeolite).

The crystalline molecular sieve may be a metal-containing molecular sieve, for example the framework of the molecular sieve itself may include framework metals other than aluminium. Alternatively, or additionally, the crystalline molecular sieve may be a metal-loaded crystalline molecular sieve (e.g. metal-loaded molecular sieve having an aluminosilicate or an aluminophosphate framework). In a metal-loaded crystalline molecular sieve, the loaded metal is a type of "extra-framework metal", that is, a metal that resides within the molecular sieve and/or on at least a portion of the molecular sieve surface, preferably as an ionic species, and does not include atoms constituting the framework of the molecular sieve. Metal-loaded crystalline molecular sieves may be prepared by post-synthesis treatment of a crystalline molecular sieve, for example, by wet impregnation, wet ion exchange or solid-state ion-exchange. In the present invention, the crystalline molecular sieve is preferably a metal-loaded crystalline molecular sieve. In particular, the crystalline molecular sieve may be loaded with a precious metal, e.g. a platinum group metal or a noble metal, or additionally or alternatively with a base metal. Thus, the crystalline molecular sieve may be a platinum group metal loaded crystalline molecular sieve or a noble metal loaded crystalline molecular sieve. When the crystalline molecular sieve comprises a base metal, then the crystalline molecular sieve may be a base metal-loaded crystalline molecular sieve. When the crystalline molecular sieve catalyst comprises a base metal and a noble metal, then the crystalline molecular sieve may be a noble and base metal-loaded crystalline molecular sieve.

Preferably, the crystalline molecular sieve is a metal-loaded aluminosilicate and the loaded metal comprises copper, palladium, platinum, or mixtures thereof. Thus, in some preferred embodiments the crystalline molecular sieve comprises copper. In another preferred embodiment, the crystalline molecular sieve comprises palladium. In yet another embodiment, the crystalline molecular sieve comprises platinum. In still further embodiments, the crystalline molecular sieve comprises a mixture of copper and/or palladium and/or platinum.

The method of the invention comprises reacting the crystalline molecular sieve with an aminosilane. The term "aminosilane" as used herein refers to an organic or inorganic molecule that comprises at least an amine functional group (i.e. a primary, secondary or tertiary amine functional group) and a silicon-containing functional group. Preferably the aminosilane is an organic aminosilane, i.e. the aminosilane comprises one or more carbon atoms, e.g. alkyl groups such as methyl or methylene.

In preferred methods of the invention, the aminosilane has the general formula:

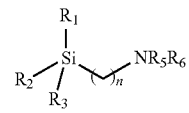

wherein
$R_1$, $R_2$, and $R_3$ are each independently selected from the list consisting of H and $OR_4$ ;
$R_4$=H, alkyl, aryl, heteroaryl or acyl;
$R_5$, and $R_6$ are each independently selected from the list consisting of H, alkyl, aryl, heteroaryl, acyl, or an amine protecting group and
n=0 to 12.

Preferably, $R_2$ and $R_3$ are each $OR_4$.

Particularly preferably, $R_5$ and $R_6$ are each H. In other words, the aminosilane is preferably a primary aminosilane. Alternatively, the aminosilane may be a secondary or tertiary aminosilane. Where the aminosilane is a secondary or tertiary aminosilane, the amine functional group may be substituted with one or more protecting groups. Preferably the protecting group or protecting groups are removable by water, acid or base.

In particularly preferred methods of the invention, the aminosilane is 3-aminopropylsilane hydrolysate. It has surprisingly been found that 3-aminopropylsilane hydrolysate is particularly advantageous for use in methods of the present invention due to it being sufficiently hydrophilic, water soluble, and chemically stable during the process of modifying the surface of the crystalline molecular sieve (e.g. zeolite).

Methods of the invention comprise carrying out the reaction between the crystalline molecular sieve and the aminosilane in an aqueous solvent. The term "aqueous solvent" as used herein refers to a solvent that contains water. Thus, the aqueous solvent may be a mixture of a water-miscible organic solvent and water. Suitable water-miscible organic solvents include—but are not limited to—alcohols (such as methanol, ethanol, propanol, and butanol), amides (such as N-methylpyrollidine, dimethylformamide and dimethylacetamide), and ethers (such as tetrahydrofuran and 1,4-dioxane). Preferably the aqueous solvent comprises water in an amount of at least 10% by volume, preferably at least 25% by volume, more preferably at least 50% by volume, and particularly preferably at least 75% by volume.

In particularly preferred methods of the invention, the aqueous solvent consists essentially of, or consists of, water. That is the aqueous solvent contains water but may also contain minor non-aqueous (e.g. organic or inorganic) impurities. Preferably the water is substantially free of organic solvents. Thus, the aqueous solvent preferably comprises water in an amount of at least 75% by volume, preferably at least 90% by volume, particularly preferably at least 95% by volume and more particularly preferably at least 99% by volume.

Thus, in particularly preferred embodiments of the invention, the aqueous solvent is substantially free of organic solvent. It has surprisingly been found that in methods wherein the aqueous solvent is substantially free of organic solvent, the resulting modified molecular sieves, e.g. modified zeolites, show improved dispersibility properties than when an organic solvent is present in the reaction mixture (e.g. as a mixture or suspension of organic solvent and water).

The water may be deionised or demineralised water.

In some preferred methods of the invention, the method further comprises the step of adjusting the pH of the reaction mixture in which the crystalline molecular sieve reacts with the aminosilane. The pH of the reaction mixture may be adjusted by the addition of an organic or inorganic acid. Alternatively, the pH of the reaction mixture may be adjusted by the addition of an organic or inorganic base. Particularly preferred acids are organic acids, such as carboxylic acids, e.g. formic acid, acetic acid or propionic acid. A particularly preferred organic acid for adjusting the pH of the reaction mixture is acetic acid.

In some preferred methods of the invention, the modified molecular sieve may undergo further modification steps, such as reacting the modified molecular sieve with a functional polymer. That is, the method comprises first reacting a molecular sieve with an aminosilane, wherein the reaction is carried out in an aqueous solvent, and further comprises reacting the modified molecular sieve thus obtained with a functional polymer.

Functional polymers that are suitable for use in preferred methods of the invention possess 'sticker' groups that have the potential to attach to the modified surface of the molecular sieve, e.g. zeolite. Such functional polymers may comprise functional groups selected from, but not limited to: carboxylic, acrylic, methacrylic, ethers, polyether, and phosphate functional groups.

Specific examples of these polymers are the Dispex Ultra PX 4275, 4575, 4522, 4583, Disperalon, and Xyndisp 168D.

The functional polymer preferably comprises one or more of the following functional groups: acrylate, methacrylate, phosphate, or $OR_7$, wherein $R_7$=H, alkyl, aryl, heteroaryl or acyl. Particularly preferably, the functional polymer comprises acrylate functional groups. Thus, the functional polymer may be a polymer or copolymer comprising acrylate functional groups. The functional polymer may be a linear polymer or may be a cross-linked polymer. The functional polymer may be a block copolymer.

Preferably the functional polymer is added as an aqueous solution.

Prior to the step of reacting the modified molecular sieve with the functional polymer, an inorganic oxide may be added to the reaction mixture. Preferred inorganic oxides include, but are not limited to, alumina, ceria, silica, magnesia, zirconia, and mixtures or mixed oxides thereof, e.g. a ceria/zirconia mixed or composite oxide, or a magnesia/alumina mixed or composite oxide. In such methods, a sufficient amount of the functional polymer, or a precursor thereof, is added to the reaction mixture to ensure that either (i) the modified molecular sieve and not the inorganic oxide is functionalised by (i.e. react with) the functional polymer; or (ii) both the modified molecular sieve and the inorganic oxide are functionalised by (i.e. react with) the functional polymer. Option (ii) is particularly preferred. Thus, in option (ii) both the modified molecular sieve and the inorganic oxide will, when the reaction is complete, contain substantially the same polymer groups on their respective surfaces. As a result, the surface properties of the modified molecular sieve comprising a functional polymer and the inorganic oxide comprising a functional polymer will be substantially more similar than those of the non-functionalised modified molecular sieve and the non-functionalised inorganic oxide.

It has surprisingly been found that methods which involve the addition of a functional polymer to a modified molecular sieve result in improved processing and handling properties, when compared to the non-functionalised modified molecular sieve. Specifically, such methods provide robust dispersion of the functionalised modified molecular sieve when incorporated in a washcoat. Without wishing to be bound by theory, it is thought that this improved dispersion results from an electro-stearic mechanism. Furthermore, this additional polymer layer on the crystalline molecular sieve, e.g. zeolite, improves the coating profile of the molecular sieve by improving its lubrication profile.

The method of the invention may further comprise the addition of a metal compound selected from a base metal, a platinum group metal, or a salt or oxide thereof to the reaction mixture. These metal compounds may be added to the crystalline molecular sieve, to the modified molecular sieve, or to the functionalised modified molecular sieve (i.e. the reaction product resulting from the addition of an aminosilane to a crystalline molecular sieve, followed by the addition of a functional polymer to the modified molecular sieve). Preferably the metal compound is added to the modified molecular sieve (i.e. the molecular sieve that has been modified by reaction with an aminosilane as hereinbefore described).

Preferred base metals, or salts or oxides thereof, include copper and iron, particularly preferably copper.

Preferred platinum group metals, or salts or oxides thereof, include platinum, palladium, rhodium, and mixtures thereof.

The crystalline molecular sieve and the aminosilane may be added to the aqueous solvent in any order. Thus, the aminosilane may be added to an aqueous solution, e.g. an aqueous slurry, of the molecular sieve, or the molecular sieve may be added to an aqueous solution of the aminosilane.

The reaction between the crystalline molecular sieve and the aminosilane is preferably carried out at a temperature of about 5 to 95° C., preferably about 10 to 75° C., more preferably about 10 to 35° C., particularly preferably about 15 to 25° C. It is particularly preferred that the reaction is carried out at about ambient temperature. It is preferred that the method of the invention is carried out at about ambient pressure. Thus preferred methods of the invention comprise reacting a crystalline molecular sieve with an aminosilane, wherein the reaction is carried out in an aqueous solvent, and wherein the reaction is carried out at a temperature of about 5 to 95° C., preferably about 10 to 75° C., more preferably about 10 to 35° C., particularly preferably about 15 to 25° C., e.g. at about ambient temperature. The reaction is preferably carried out at a pressure of about 1 atm.

The reaction of the molecular sieve and the aminosilane is carried out for sufficient time to form a modified molecular sieve. Typically, the reaction time required is in the order of hours or less, e.g. less than about 3 hours, preferably less than about 2 hours, more preferably less than about 1 hour, i.e. from about 1 to about 180 minutes, preferably from about 1 to about 120 minutes, more preferably from about 1 to about 60 minutes. Particularly preferably the reaction time is on the order of minutes, e.g. less than about 60 minutes, preferably less than about 30 minutes, and more preferably less than about 10 minutes.

Preparation of the modified molecular sieve may be carried out in a step-wise, e.g. sequential, manner. Alternatively, preparation of the modified molecular sieve may be carried out in a batch process, i.e. without the isolation or purification of intermediate compounds (such as the modified molecular sieve), with the sequential addition of reagents. Furthermore, reactions may be carried out a plurality of times to obtain additional benefits, e.g. two, three or four times. For example, carrying out the reaction of the crystalline molecular sieve with an amiosilane a plurality of times may result in an increased amount of the aminosilane reacting with the surface of the molecular sieve, to obtain a higher yield of the modified molecular sieve than if the reaction is carried out once. For the avoidance of doubt, it is not necessary to carry out the method of the invention a plurality of times in order to obtain a modified molecular sieve.

A further aspect of the invention is a modified molecular sieve obtained or obtainable by the method as hereinbefore described. Such modified molecular sieves may have improved processing and handling properties compared to unmodified molecular sieves, for example, when used in a washcoat for the preparation of a catalyst article.

Particularly preferred modified molecular sieves obtainable by the method as hereinbefore described include—but are not limited to—a modified molecular sieve having the general formula:

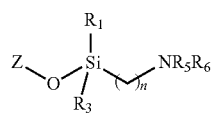

wherein
Z is a molecular sieve, preferably a zeolite;

$R_2$ and $R_3$ are each independently selected from the list consisting of H and $OR_4$;
$R_4$=Z, H, alkyl, aryl, heteroaryl or acyl;
$R_5$ and $R_6$ are each independently selected from the list consisting of H, alkyl, aryl, heteroaryl, acyl, or an amine protecting group; and
n=0 to 12.
Particularly preferably, $R_5$ and $R_6$ are each H.
In one particularly preferred embodiment of the modified molecular sieve, $R_2$ and $R_3$ are each $OR_4$, $R_4$ is H or Z, n=2, and $R_5$ and $R_6$ are each H.

It has surprisingly been found that catalytic compositions prepared with modified molecular sieves obtainable by the method described herein have improved catalytic properties compared to unmodified molecular sieves. In particular, a catalytic composition comprising a Pd-containing modified molecular sieve has improved NOx storage and improved CO oxidation properties compared to an unmodified Pd-containing molecular sieve.

A further aspect of the invention is a washcoat comprising a modified molecular sieve as hereinbefore described. The composition may, in addition to the modified molecular sieve, comprise additional components such as solvents, binders and dispersants. Compositions of the invention may comprise additional catalytically active components, such as one or more further molecular sieve catalysts (which may be modified or unmodified), oxygen storage components, NOx storage components, or oxidation catalysts (e.g. comprising one or more base metals or PGMs supported on an inorganic oxide).

The washcoat is typically a solution, such as a slurry or a suspension comprising the modified molecular sieve. The washcoat may preferably comprise water, i.e. preferably the composition is an aqueous solution or suspension comprising the modified molecular sieve.

A further aspect of the invention is a method of forming a catalyst article, said method comprising: (i) coating a substrate with a washcoat comprising a modified molecular sieve as hereinbefore described; and ii) drying and/or calcining said coated substrate.

The step of coating the washcoat onto a substrate in the methods above may be any conventional method for applying washcoats onto a substrate that is known in the art (see, for example, WO 99/47260, WO 2007/077462, WO 2011/080525 and WO2014/195685, each of which is incorporated herein by reference).

The substrate may have an inlet end and an outlet end and may comprise a plurality of channels (e.g. for the exhaust gas to flow through). Generally, the substrate is a ceramic material or a metallic material.

It is preferred that the substrate is made or composed of cordierite ($SiO_2$—$Al_2O_3$—MgO), silicon carbide (SiC), Fe—Cr—Al alloy, Ni—Cr—Al alloy, aluminum titanate or a stainless steel alloy.

Typically, the substrate is a monolith. Monoliths are well-known in the art. The monolith may be a flow-through monolith or a filtering monolith suitable for filtering particulates from combustion engine exhaust gas, such as diesel exhaust.

A flow-through monolith typically comprises a honeycomb monolith (e.g. a metal or ceramic honeycomb monolith) having a plurality of channels extending therethrough, wherein each channel is open at the inlet end and the outlet end.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous wall.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a checkerboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The substrate may be an electrically heatable substrate (i.e. the electrically heatable substrate is an electrically heating substrate, in use). When the substrate is an electrically heatable substrate, the catalyst of the invention comprises an electrical power connection, preferably at least two electrical power connections, more preferably only two electrical power connections. Each electrical power connection may be electrically connected to the electrically heatable substrate and an electrical power source. The catalyst can be heated by Joule heating, where an electric current through a resistor converts electrical energy into heat energy.

Examples of suitable electrically heatable substrates are described in U.S. Pat. No. 4,300,956, 5,146,743 and 6,513,324.

In general, the electrically heatable substrate comprises a metal. The metal may be electrically connected to the electrical power connection or electrical power connections.

Typically, the electrically heatable substrate is an electrically heatable honeycomb substrate. The electrically heatable substrate may be an electrically heating honeycomb substrate, in use.

The electrically heatable substrate may comprise an electrically heatable substrate monolith (e.g. a metal monolith). The monolith may comprise a corrugated metal sheet or foil. The corrugated metal sheet or foil may be rolled, wound or stacked. When the corrugated metal sheet is rolled or wound, then it may be rolled or wound into a coil, a spiral shape or a concentric pattern.

The metal of the electrically heatable substrate, the metal monolith and/or the corrugated metal sheet or foil may comprise an aluminium ferritic steel, such as Fecralloy™.

For step (ii) of the method described above, i.e. the step of drying and/or calcining the coated substrate, suitable drying and calcination conditions depend on the composition (i.e. the composition comprising the modified molecular sieve) and the type of substrate. Such conditions are known in the art.

A further aspect of the invention is a catalyst article obtained or obtainable by the method as hereinbefore define.

It has surprisingly been found that such catalyst articles, i.e. catalyst articles obtained or obtainable by the method as described herein, have improved (i.e. lower) backpressure relative to catalysts comprising a composition comprising an unmodified molecular sieve. This advantage is particularly useful in the case of catalyst articles which comprise a filter substrate (e.g. a wall-flow filter substrate), as overcoming backpressure issues in such catalyzed substrates is particularly challenging.

The catalyst article of the invention may be a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC), a cold start catalyst (dCSC), a gasoline particulate filter (GPF) or a three-way catalyst (TWC). The catalyst article may be a zoned or layered catalyst, wherein different zones or layers may comprise different catalytic materials.

Some of the aforementioned catalysts may have filtering substrates. A catalyst article having a filtering substrate may be selected from the group consisting of a a catalysed soot filter (CSF), a selective catalytic reduction filter (SCRF™) catalyst, and a gasoline particulate filter (GPF).

A further aspect of the invention is a method of treating an exhaust gas comprising contacting the exhaust gas with a catalyst article as hereinbefore described. The exhaust gas may be an exhaust gas from an internal combustion engine, such as a vehicular internal combustion engine. Alternatively, the exhaust gas may be from a stationary source, for example, an exhaust gas from a power plant.

In preferred methods, the exhaust gas is a rich gas mixture. In further preferred methods, the exhaust gas cycles between a rich gas mixture and a lean gas mixture. Preferably the internal combustion engine is a lean burn engine. Preferably, the lean burn engine is a diesel engine.

The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

It is preferred that the lean burn engine is configured or adapted to run on fuel, preferably diesel fuel, comprises 50 ppm of sulfur, more preferably 15 ppm of sulfur, such as 10 ppm of sulfur, and even more preferably 5 ppm of sulfur.

Where the exhaust gas is an exhaust gas from an internal combustion engine, the internal combustion engine is preferably a component of a vehicle. The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

In some preferred methods of treating an exhaust gas from an internal combustion engine, the exhaust gas is at a temperature of about 150 to 750° C.

In some embodiments, the catalyst article of the present invention may comprise an SCR catalyst, in which case the method treating an exhaust gas may further comprise the injection of a reductant, for example a nitrogenous reductant, such as ammonia, or an ammonia precursor, such as urea or ammonium formate, preferably urea, into exhaust gas upstream of the catalyst article.

Such an injection may be carried out by an injector. The injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst catalyst). Thus, the method may further comprise enriching of the exhaust gas with hydrocarbons.

In further preferred methods of treating an exhaust gas, the exhaust gas is contacted with one or more further emissions control devices, in addition to the catalyst article as hereinbefore described. The further emissions control device or devices is/are preferably downstream of the catalyst article of the invention. Alternatively, the further emissions control device or devices is/are upstream of the catalyst article of the invention.

Examples of a further emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC), a cold start catalyst (dCSC), a gasoline particulate filter (GPF), a three-way catalyst (TWC) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), a selective catalytic reduction filter (SCRF™) catalyst, a gasoline particulate filter (GPF) and a three-way catalyst (TWC).

EXAMPLES

The invention will now be illustrated by the following non-limiting examples.

Materials

All materials are commercially available and were obtained from known suppliers, unless noted otherwise.

Example 1

A commercially available zeolite with a Chabazite structure and comprising about 3wt % copper was dispersed in water at a concentration of 30 wt % as measured by total solids. To this a commercially available solution of 30 wt % of 3-aminopropylsilane hydrolysate in water was added. The concentration of 3-aminopropylsilane hydrolysate solution was 1% by dry weight of zeolite solids. If needed, the pH of the reaction mixture was adjusted using acetic acid targeting a range of 4 to 6. Without wishing to be bound by theory, it is thought that this causes an irreversible deposition of aminosilane moiety on the surface of the zeolite.

As the surface of the zeolite was modified with an amine, a change in the isoelectric point of the system can be measured. The isoelectric point is defined as the pH at which the surface charge of the zeolite is zero. This measurement is done by adding 200 microliters of a slurry comprising the modified zeolite in 200 mL of deionized water and stirring the solution for 10 minutes to allow for equilibration. Subsequently a small aliquot of the diluted solution is transferred to a zeta-potential measuring cell and the surface charge is measured using a Malvern Zeta Nano S zeta-potential analyzer. The pH is varied by addition of either a base (tetraethyl ammonium hydroxide) or acid (acetic acid) until the isoelectric point is reached. The results of this experiment are shown in Table 1 below. Sample 1 is the unmodified zeolite. Sample 2 is a modified zeolite prepared by the method according to the present invention.

TABLE 1

| Sample | Composition | Isoelectric point |
|---|---|---|
| 1 | CHA zeolite | 2.2 |
| 2 | CHA zeolite + 3-aminopropyl silane | 9.3 |

As can be seen from the results in Table 1, the method according to the present invention results in a change in the isoelectric point of the CHA zeolite as a result of the modification of the zeolite surface by the addition of an aminosilane.

Example 2

As in Example 1, a commercially available zeolite with a Chabazite structure and comprising about 3 wt % copper was dispersed in water at a concentration of 30 wt % as measured by total solids. To this a commercially available solution of 30 wt % of 3-aminopropylsilane hydrolysate in water was added. The concentration of 3-aminopropylsilane hydrolysate solution was 1% by dry weight of zeolite solids. If needed, the pH of the reaction mixture was adjusted using acetic acid targeting a range of 4 to 6. As the surface of the zeolite has now been modified to an amine surface, this allows for conventional dispersants to be attached. Xyndisp XA168D is a functional polymer sold by Xyntra BV as a dispersant, which possesses acrylic groups that are able to interact with the amines on the zeolite. Using electrostatic interaction between the functional polymer and the modified zeolite, a more robustly dispersed system can be created using electro-steric stabilization. To the modified zeolite slurry, 5wt % of an aqueous solution of XA168D is added with respect to dry zeolite solids. The polymer concentration is calculated with respect to the dry weight of zeolite. Subsequently any necessary pH adjustments are made with either acetic acid or tetraethyl ammonium hydroxide to bring the pH to between 6 and 7.

As the surface of the zeolite was modified with an amine, a change in the isoelectric point of the system can be measured. The isoelectric point is defined as the pH in which the surface charge of the zeolite is zero. This measurement is done by adding 200 microliters of a slurry comprising the modified zeolite in 200 mL of deionized water, and stirring the solution for 10 minutes to allow for equilibration. Subsequently a small aliquot of the diluted solution is transferred to a zeta-potential measuring cell and the surface charge is measured using a Malvern Zeta Nano S zeta-potential analyzer. The pH is varied by addition of either a base (tetraethyl ammonium hydroxide) or acid (acetic acid) until the isoelectric point is reached. The results of this experiment are shown in Table 2 below. Sample 1 is the unmodified zeolite. Sample 2 is a modified zeolite prepared according to the method of the invention described in Example 1. Sample 3 is a modified zeolite that has been further functionalized by the addition of a functional polymer, as described above.

TABLE 2

| Sample | Composition | Isoelectric point |
|---|---|---|
| 1 | CHA zeolite | 2.2 |
| 2 | CHA zeolite + 3-aminopropyl silane | 9.3 |
| 3 | CHA zeolite + 3-aminopropyl silane + functional polymer* | 4.60 |

*XA168D

Example 3

Unmilled zeolites were used to coat filter substrates using the method of surface modification followed by polymer addition. The surface modified zeolites were prepared according to the following method. As in Example 1 and 2, a commercially available zeolite but with a AEI structure and comprising 3.75wt % copper was dispersed in water at a concentration of 30 wt % as measured by total solids. To this a commercially available solution of 30 wt % of 3-aminopropylsilane hydrolysate in water was added. The concentration of 3-aminopropylsilane hydrolysate solution was 1% by dry weight of zeolite solids. If needed, the pH of the reaction mixture was adjusted using acetic acid targeting a range of 4 to 6. To this washcoat a commercially available binder was added. The concentration of the binder is calculated to be 11% by weight with respect to dry zeolite solids. Final solids concentration was adjusted to 35.5% by weight using water addition. To this zeolite-binder slurry, 5 wt % of an aqueous solution of XA168D is added with respect to dry zeolite solids. The polymer concentration is calculated with respect to the dry weight of zeolite. Subsequently any necessary pH adjustments are made with either acetic acid or tetraethyl ammonium hydroxide to bring the pH to between 6 and 7.

The slurry thus prepared was used to coat filter substrates made of SiC using conventional washcoat dosing techniques. The final washcoat loading on the substrate was aimed to be at 1.9 g/in³. A reference part was also dosed in the same method but with a different washcoat. The reference washcoat contained a zeolite that had not been modified by the method according to the present invention, but was otherwise the same. Coated parts were characterized by the final backpressure as measured using Flowbench SF-1020 manufactured by Superflow at a flow rate of 600 m³/hr. The results are shown in Table 3 below. Sample 1 is the filter substrate comprising a modified zeolite prepared by the method of the invention. Sample 2 is the reference part. Backpressure for the reference part was greater than the maximum measureable limit for the machine.

TABLE 3

| Samples | Backpressure (mbar) |
|---|---|
| Sample 1 | 53.4 |
| Sample 2 | >100 |

As can be seen from the results in Table 3, the substrate comprising a modified molecular sieve prepared according to a method of the invention results in lower backpressure compared to the reference part, which comprised an unmodified molecular sieve component.

Example 4

A commercially available zeolite with a Chabazite structure was dispersed in water at a concentration of 30 wt % as measured by total solids. To this a commercially available solution of 30 wt % of 3-aminopropylsilane hydrolysate in water was added. The concentration of 3-aminopropylsilane hydrolysate solution was 1% by dry weight of zeolite solids. If needed, the pH of the reaction mixture was adjusted using acetic acid targeting a range of 4 to 6. Without wishing to be bound by theory, it is thought that this causes an irreversible deposition of aminosilane moiety on the surface of the zeolite.

As the surface of the zeolite has now been modified to an amine surface, this allows for the addition of metals salts. Certain metal salts are able to interact with the amine surface of the modified zeolite quite strongly. An amine-stabilised palladium salt is added so that the net addition of palladium is 1.5 wt % with respect to zeolite solids. This solution was then dried and calcined at a temperature of 500° C. for two hours. A second sample was prepared by the same method, but without the addition of 3-aminopropylsilane hydrolysate in water prior to the addition of the palladium salt. The samples were analysed in a solid state UV/VIS spectrometer to quantify the amount of exchanged palladium to palladium oxide on the surface.

The UV-VIS spectra of the samples were measured using a Perkin Elmer Lambda 650S spectrometer, equipped with a Praying Mantis. The measurements are done in diffuse reflectance mode with the scanning wavelength from 800-180 $cm^{-1}$ with an interval of 2 $cm^{-1}$ at room temperature. Ratio of exchanged Pd to PdO is determined by using the Kubelka-Munk values at 200 $cm^{-1}$ (corresponding to the Pd—O charge transfer band) and 400 $cm^{-1}$ (used as a reference point for PdOx) respectively.

The powders were also tested for catalytic performance, in this case NOx storage. To test the NOx storage activity of the catalysts, 0.4 g of pelletized (350-225 micron) powder was heated to and held at 100° C. under a flow of $N_2$ at 2 L/min. At 100° C. the powder was exposed to a gas mixture consisting of 12 vol. % $O_2$, 60 ppm NO, 5 vol. % $CO_2$, 1500 ppm CO, 150 ppm $C10H_{22}$, and 5 vol. % $H_2O$ for 5 minutes prior to ramping the temperature at 14° C./min to 500° C. The gas concentrations were monitored with an online FTIR gas analyzer. Subsequently the catalytic performance was calculated using these FTIR measurements, which are shown in Table 4 below. Sample 1 was prepared by the method of the invention. Sample 2 is a reference sample where the palladium was added to a zeolite that had not undergone surface modification with an aminosilane.

TABLE 4

| Sample | Pd/PdO ratio | NO storage (mg/g) | Pd:NO ratio |
|---|---|---|---|
| Sample 1 | 430 | 1.83 | 0.43 |
| Sample 2 | 5 | 1.03 | 0.22 |

As can be seen from the results in Table 4, Sample 1, which was prepared by a method according to the invention, has improved NOx storage compared to Sample 2, which was not modified by addition of an aminosilane to the zeolite prior to the addition of the palladium salt.

Example 5

The same samples as in Example 4 above were tested for catalytic performance as measured by carbon monoxide oxidation. The light off temperatures is the temperature at which 50% oxidation of CO occurs. The CO oxidation activity of each of the powder samples the catalyst was measured under the same conditions as in Example 4. The results are shown in Table 5 below.

TABLE 5

| Samples | CO light off (T50, ° C.) |
|---|---|
| Sample 1 | 178 |
| Sample 2 | 188 |

As can be seen from the results in Table 5, Sample 1, which was prepared by a method according to the invention, has a lower CO light off temperature, i.e. improved CO oxidation performance, compared to Sample 2, which was not modified by addition of an aminosilane to the zeolite prior to the addition of the palladium salt.

Example 6

A commercially available zeolite with a AEI structure and comprising about 3wt % copper was dispersed in water at a concentration of 30 wt % as measured by total solids. To this a commercially available solution of 30 wt % of 3-aminopropylsilane hydrolysate in water was added. The concentration of 3-aminopropylsilane hydrolysate solution was 1% by dry weight of zeolite solids. If needed, the pH of the reaction mixture was adjusted using acetic acid targeting a range of 4 to 6. Without wishing to be bound by theory, it is thought that this causes an irreversible deposition of aminosilane moiety on the surface of the zeolite.

As the surface of the zeolite has now been modified to an amine surface, this allows for the addition of metals salts. Certain metal salts are able to interact with the amine surface of the modified zeolite quite strongly. An amine-stabilised palladium salt is added so that the net addition of palladium is 1.5 wt % with respect to zeolite solids. This solution was then dried and calcined at a temperature of 500° C. for two hours. The calcined powder was dispersed in water at a concentration of 30 wt %. To this slurry a further 5 wt % of 3-aminopropylsilane hydrolysate in water was added with respect to the zeolite weight. This slurry was further dried in a convective oven at 100° C., then calcined at 500° C. for 2 hours. Table 6 below shows the effect of the peak release temperature of NOx, which is defined by the temperature at which the maximum amount of NOx is being released by the catalyst. Sample 1 was prepared by the method of the invention. Sample 2 is a reference sample where the palladium was added to a zeolite that had not undergone surface modification with an aminosilane.

TABLE 6

| Samples | Peak NOx release temperature (° C.) |
|---|---|
| Sample 1 | 266 |
| Sample 2 | 238 |

As can be seen from the results in Table 6, Sample 1, which was prepared by a method according to the invention, has a higher peak NOx release temperature than Sample 2, which comprises an unmodified zeolite. This higher NOx release temperature is advantageous in applications where a downstream catalytic device, such as an SCR catalyst, is used to reduce the released NOx. A higher NOx release temperature means that the downstream catalytic device is more likely to have achieved its light-off temperature, and hence is catalytically active for the reduction of NOx released from the modified molecular sieve-containing catalyst. This results in lower NOx slippage from the exhaust system.

The invention claimed is:

1. A method for preparing a modified molecular sieve, which method comprises reacting a crystalline small pore molecular sieve or large pore molecular sieve with an aminosilane, wherein the reaction is carried out in an aqueous solvent and wherein the aqueous solvent comprises water in an amount of at least 10% by volume, wherein the small pore molecular sieve is a crystalline molecular sieve having a maximum ring size of eight tetrahedral atoms, and the large pore molecular sieve is a crystalline molecular sieve having a maximum ring size of twelve tetrahedral atoms.

2. The method according to claim 1, wherein the aqueous solvent comprises water in an amount of at least 25% by volume.

3. The method according to claim 1, wherein the crystalline molecular sieve has an aluminosilicate framework, an aluminophosphate framework, a silicoaluminophosphate framework, a metal-substituted aluminosilicate framework, a metal-loaded aluminophosphate framework, or a metal-loaded silicoaluminophosphate framework.

4. The method according to claim 3, wherein the crystalline molecular sieve is a metal-loaded molecular sieve having an aluminosilicate framework and the loaded metal comprises copper, palladium, platinum, or mixtures thereof.

5. The method according to claim 1, wherein the crystalline molecular sieve is a small pore molecular sieve and has a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and a mixture or intergrowth of any two or more thereof.

6. The method according to claim 5, wherein the small pore molecular sieve has a Framework Type that is AEI, AFX or CHA.

7. The method according to claim 1, wherein the crystalline molecular sieve has an aluminosilicate framework or a metal-loaded aluminosilicate framework and a silica to alumina molar ratio of 10 to 200.

8. The method according to claim 1, wherein the aminosilane has the general formula:

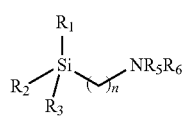

wherein $R_1$, $R_2$, and $R_3$ are each independently selected from the list consisting of H and $OR_4$;

$R_4$=H, alkyl, aryl, heteroaryl, acyl, or an amine protecting group;

$R_5$, and $R_6$ are each independently selected from the list consisting of H, alkyl, aryl, heteroaryl or acyl; and n=0 to 12.

9. The method according to claim 8, wherein $R_2$ and $R_3$ are each independently $OR_4$.

10. The method according to claim 8, wherein $R_5$ and $R_6$ are each H.

11. The method according to claim 1, wherein the aminosilane is 3-aminopropylsilane hydrolysate.

12. The method according to claim 1, wherein the aqueous solvent consists essentially of water.

13. The method according to claim 1, further comprising a step of adjusting the pH of the reaction mixture.

14. The method according to claim 1, further comprising a step of reacting the modified molecular sieve with a functional polymer.

15. The method according to claim 14, wherein the functional polymer comprises one or more of the following functional groups: acrylate, methacrylate, phosphate, or $OR_7$, wherein $R_7$=H, alkyl, aryl, heteroaryl or acyl.

16. The method according to claim 15, wherein the functional polymer comprises acrylate functional groups.

17. The method according to claim 1, further comprising a step of reacting the modified molecular sieve with a base metal, a platinum group metal, or a salt or oxide thereof.

18. A modified molecular sieve obtainable by the method of claim 1.

19. A method of forming a catalyst article, said method comprising:
  i) coating a substrate with a washcoat comprising a modified molecular sieve according to claim 18; and
  ii) drying and/or calcining the coated substrate.

20. A catalyst article obtained or obtainable by the method of claim 19.

21. A method of treating an exhaust gas comprising contacting the exhaust gas with a catalyst article according to claim 20.

22. A method for forming a catalyst article comprising the steps of:
  a) reacting a crystalline molecular sieve with an aminosilane in an aqueous solvent comprising water in an amount of at least 10% by volume to form a modified molecular sieve;
  b) coating a substrate with a washcoat comprising the modified molecular sieve; and
  c) drying and/or calcining the coated substrate.

23. The method as claimed in claim 22 wherein in step (a) the aqueous solvent comprises water in an amount at least 25% by volume.

24. The method as claimed in claim 22 wherein in step (a) the aqueous solvent consists essentially of water.

25. The method of claim 22, wherein in step (a) the crystalline molecular sieve is a metal-loaded molecular sieve having an aluminosilicate framework and the loaded metal comprises copper, palladium, platinum, or mixtures thereof.

26. The method according to claim 22, wherein the crystalline molecular sieve is a small pore molecular sieve having a Framework Type that is AEI, AFX or CHA.

27. The method of claim 22, wherein in step (a) the aminosilane has the general formula:

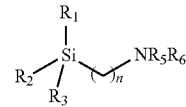

wherein $R_1$, $R_2$, and $R_3$ are each independently selected from the list consisting of H and $OR_4$;

$R_4$=H, alkyl, aryl, heteroaryl, acyl, or an amine protecting group;

$R_5$, and $R_6$ are each independently selected from the list consisting of H, alkyl, aryl, heteroaryl or acyl; and n=0 to 12.

28. The method according to claim 27, wherein the aminosilane is 3-aminopropylsilane hydrolysate.

* * * * *